(12) United States Patent
LeGallee

(10) Patent No.: US 6,686,042 B1
(45) Date of Patent: Feb. 3, 2004

(54) OPTICALLY VARIABLE PIGMENTS AND FOILS WITH ENHANCED COLOR SHIFTING PROPERTIES

(75) Inventor: Charlotte R. LeGallee, Healdsburg, CA (US)

(73) Assignee: Flex Products, Inc., Santa Rosa, CA (US)

( * ) Notice: Subject to any disclaimer, the term of this patent is extended or adjusted under 35 U.S.C. 154(b) by 149 days.

(21) Appl. No.: 09/668,629

(22) Filed: Sep. 22, 2000

(51) Int. Cl.$^7$ ................................................. B32B 5/16
(52) U.S. Cl. .................... 428/403; 428/363; 428/404; 428/633; 428/701; 359/580; 359/585; 359/586; 359/588; 359/589; 359/582; 106/415; 106/417; 106/439; 106/459; 106/472; 106/474; 106/479; 106/404
(58) Field of Search ................................. 478/363, 403, 478/404, 699, 701; 106/415, 417, 439, 459, 472, 474, 479, 404; 359/580, 585, 586, 588, 589, 582

(56) References Cited

U.S. PATENT DOCUMENTS

| | | |
|---|---|---|
| 3,011,383 A | 12/1961 | Sylvester et al. |
| 3,123,490 A | 3/1964 | Bolomey et al. |
| 3,412,575 A | 11/1968 | Feldman et al. |
| 3,622,473 A | 11/1971 | Ohta et al. |
| 3,858,977 A | 1/1975 | Baird et al. |
| 3,926,659 A | 12/1975 | Bernhard et al. |
| 3,949,139 A | 4/1976 | Dunning et al. |
| 3,962,397 A | 6/1976 | Narui et al. |
| 3,988,494 A | 10/1976 | McAdow |
| 4,116,710 A | 9/1978 | Heikel |

(List continued on next page.)

FOREIGN PATENT DOCUMENTS

| | | |
|---|---|---|
| EP | 353544 | 7/1990 |
| EP | 0 395 410 | 10/1990 |
| EP | 686675 | 12/1995 |
| EP | 0 984 043 | 3/2000 |
| JP | 56-130469 | 10/1982 |
| JP | 10-147065 | 6/1989 |
| WO | WO 96/22336 | 7/1996 |
| WO | WO 96/38505 | 12/1996 |
| WO | WO 00/31571 | 6/2000 |
| WO | WO 00/34395 | 6/2000 |
| WO | WO 00/43457 | 7/2000 |
| WO | WO 01/18127 | 3/2001 |

OTHER PUBLICATIONS

J.A. Dobrowoski, K.M. Baird, P.D. Carman and A. Waldorf, "Optical Interference Coatings for Inhibiting of Counterfeiting," Optica Acta, 1973, vol. 20, No. 12, pp. 925–937.

Craig R. Barrett, William D. Nix and Alan S. Tetelman, "The Principles of Engineering Materials," Prentice–Hall, 282–290, 1973.

(List continued on next page.)

Primary Examiner—Leszek Kiliman
(74) Attorney, Agent, or Firm—David O. Seeley; Holme Roberts & Owens LLP

(57) ABSTRACT

Pigment flakes are provided which can be used to produce colorant compositions having color shifting properties. The pigment flakes can have a symmetrical coating structure on opposing sides of a reflector layer, can have an asymmetrical coating structure with all of the layers on one side of the reflector layer, or can be formed with encapsulating coatings around a reflector layer. The coating structure includes a selective absorbing layer on one or more sides of the reflector layer, a dielectric layer on the selective absorbing layer, and an absorber layer on the dielectric layer. The pigment flakes exhibit a discrete color shift such that the pigment flakes have a first color at a first angle of incident light or viewing and a second color different from the first color at a second angle of incident light or viewing. The pigment flakes can be interspersed into liquid media such as paints or inks for subsequent application to objects or papers. A color shifting foil is also provided which includes the coating structure of reflector/selective absorber/dielectric/absorber.

60 Claims, 7 Drawing Sheets

U.S. PATENT DOCUMENTS

| | | |
|---|---|---|
| 4,168,983 A | 9/1979 | Vittands et al. |
| 4,213,886 A | 7/1980 | Turner |
| 4,309,075 A | 1/1982 | Apfel et al. |
| 4,321,087 A | 3/1982 | Levine et al. |
| 4,434,010 A | 2/1984 | Ash |
| 4,552,593 A | 11/1985 | Ostertag |
| 4,623,396 A | 11/1986 | Kimura et al. |
| 4,629,512 A | 12/1986 | Kondis |
| 4,705,300 A | 11/1987 | Berning et al. |
| 4,705,356 A | 11/1987 | Berning et al. |
| 4,721,217 A | 1/1988 | Phillips et al. |
| 4,756,771 A | 7/1988 | Brodalla et al. |
| 4,838,648 A | 6/1989 | Phillips et al. |
| 4,940,523 A | 7/1990 | Takeshima |
| 4,978,394 A | 12/1990 | Ostertag et al. |
| 5,009,486 A | 4/1991 | Dobrowolski et al. |
| 5,059,245 A | 10/1991 | Phillips et al. |
| 5,084,351 A | 1/1992 | Philips et al. |
| 5,116,664 A | 5/1992 | Kimura et al. |
| 5,135,812 A | 8/1992 | Phillips et al. |
| 5,171,363 A | 12/1992 | Phillips et al. |
| 5,190,807 A | 3/1993 | Kimock et al. |
| 5,198,042 A | 3/1993 | Masumoto et al. |
| 5,214,530 A | 5/1993 | Coombs et al. |
| 5,225,057 A | 7/1993 | LeFebvre et al. |
| 5,278,590 A | 1/1994 | Phillips et al. |
| 5,279,657 A | 1/1994 | Phillips et al. |
| 5,332,767 A | 7/1994 | Reisser et al. |
| 5,356,471 A | 10/1994 | Reynders |
| 5,364,467 A | 11/1994 | Schmid et al. |
| 5,378,527 A | 1/1995 | Nakanishi et al. |
| 5,549,774 A | 8/1996 | Miekka et al. |
| 5,571,624 A * | 11/1996 | Phillips et al. .............. 428/403 |
| 5,573,584 A | 11/1996 | Ostertag et al. |
| 5,587,207 A | 12/1996 | Gorokhovsky |
| 5,593,773 A | 1/1997 | McKay et al. |
| 5,607,504 A | 3/1997 | Schmid et al. |
| 5,624,076 A | 4/1997 | Miekka et al. |
| 5,624,486 A * | 4/1997 | Schmid ..................... 106/404 |
| 5,629,068 A | 5/1997 | Miekka et al. |
| 5,648,165 A | 7/1997 | Phillips et al. |
| 5,672,410 A | 9/1997 | Miekka et al. |
| 5,763,086 A | 6/1998 | Schmid et al. |
| 5,766,334 A | 6/1998 | Hashizume et al. |
| 5,766,335 A | 6/1998 | Bujard et al. |
| 5,790,304 A | 8/1998 | Sanders et al. |
| 5,830,567 A | 11/1998 | Panush |
| 5,858,078 A | 1/1999 | Andes et al. |
| 5,877,895 A | 3/1999 | Shaw et al. |
| 6,013,370 A | 1/2000 | Coulter et al. |
| 6,569,529 B1 * | 5/2003 | Phillips et al. .............. 428/403 |

OTHER PUBLICATIONS

William D. Callister, Jr., "*Materials Science and Engineering: An Introduction,*" John Wiley & Sons, Inc., 91–112, 1985.

John M. McKiernan, et al., "*Luminescence and Laser Action of Coumarin Dyes Doped in Silicate and Aluminosilicate Glasses Prepared by the Sol–Gel Technique,*" Journal of Inorganic and Organometallic Polymers, vol. 1, No. 1, 87–103, 1991.

Dr. Klaus Greiwe, "*Coloured Aluminium Pigments,*" Eckart–Werke, Werk Güntersthal, 4th Nürnberg Congress, Paper 6, 1–7, 1985.

Minolta Manual for *Precise Color Communication: Color Control From Felling to Instrumentation*, pp. 18, 20, 22, 23, 46, 47, 48 and 49, 1987.

The Mearl Corporation brochure for "*Mearl Iridescent Film,*" Peekskill, New York, 1986.

B. Window, F. Sharples and N. Savvides, "*Magnetically Confined Sputter Source with High Ion Flux,*" J. Vac. Sci. Technol. A 3(6), Nov./Dec. 1985, p. 2368–2372.

N. Savvides and B. Window, "*Unbalanced Magnetron Ion–Assisted Deposition and Property Modification of Thin Films,*" J. Vac. Sci. Technol. A 4(3), May/Jun. 1986, p. 504–508.

CHROMAFLAIR Light Interference Pigments, Technical Bulletin No. 2, "*Dynamic Color Area Diagram and Value,*" TB–02–98, 1998.

Deborah W. Siegmann, Charles E. Carraher, Jr., and Dora Brenner, "*Platinum II Polyamines: Determination of Size by Sephacryl Column Chromatography,*" Department of Chemistry, Florida Atlantic University, Boca Raton, Florida, 1987.

"*Sol–Gel Processing,*" http://faculty.washington.edu/gzcao/group/solgel.htm, Aug. 15, 2000.

FEW's Sol–Gel Technology, "*Sol–Gel Technology,*" http://www.few.de/en/sol–gel.stm, Aug. 15, 2000.

Phalippou, Jean, "*Sol–Gel: A Low Temperature Process for the Materials of the New Millennium,*" The Sol–Gel Gateway, http://www.solgel.com/articles/June00/phalip/introsolgel.htm, Aug. 15, 2000.

* cited by examiner

OPTICALLY VARIABLE PIGMENTS AND FOILS WITH ENHANCED COLOR SHIFTING PROPERTIES

BACKGROUND OF THE INVENTION

1. The Field of the Invention

The present invention relates generally to color shifting pigment compositions. More specifically, the present invention relates to optically variable pigment flakes, foils, and colorants which exhibit enhanced color shifting properties with changes in angle of incident light or with viewing angle.

2. The Prior State of the Art

Various optically variable pigments, also known as color shifting pigments, have been developed for a wide variety of applications. For example, color shifting pigments have been used in applications ranging from automobile paints, to anti-counterfeiting inks for security documents and monetary currency. Color shifting colorants are produced by dispersing small flakes, which are typically composed of multiple layers of thin films having particular optical characteristics, throughout a medium such as paint or ink that may then be subsequently applied to the surface of an object. Color shifting pigments and colorants exhibit the property of changing color upon variation of the angle of incident light, or as the viewing angle of the observer is shifted.

Conventional optically variable pigments are typically based on multilayer thin film interference structures. For example, U.S. Pat. No. 5,135,812 to Phillips et al. discloses optically variable thin film flakes having several different configurations of layers, such as transparent all-dielectric stacks, or transparent dielectric and semi-transparent metallic layered stacks. In U.S. Pat. No. 5,278,590 to Phillips et al., a symmetric three layer optical interference coating is disclosed which comprises first and second partially transmitting absorber layers which have essentially the same composition and thickness, and a dielectric spacer layer located between the first and second absorber layers.

Color shifting platelets for use in paints are disclosed in U.S. Pat. No. 5,571,624 to Phillips et al. These platelets are formed from a symmetrical multilayer thin film structure in which a first semi-opaque layer is formed on a substrate, with a first dielectric layer formed on the first semi-opaque layer. A reflecting layer is formed on the first dielectric layer, followed by a second dielectric layer formed on the reflecting layer, and a second semi-opaque layer formed on the second dielectric layer. The color shifting properties of a pigment can be controlled through proper design of the optical coatings used to form the flakes. Desired effects can be achieved through the variation of parameters such as the thickness of the layers forming the flakes and the index of refraction of each layer. The changes in perceived color which occur for different viewing angles or angles of incident light are a result of a combination of selective absorption of the materials forming the layers, and wavelength-dependent interference effects. The interference effects, which arise from the superposition of light waves that have undergone multiple reflections, are responsible for the shifts in color perceived with different angles. The reflection maxima changes in position and intensity, as the viewing angle changes, due to the absorption characteristics of a material which are selectively enhanced at particular wavelengths from the interference phenomena.

SUMMARY OF THE INVENTION

It is an object of the present invention to provide optically variable pigment flakes and foils which exhibit enhanced color shifting properties.

Another object of the invention is to provide color shifting pigment flakes and foils which have substantial shifts in chroma and hue with changes in angle of incident light or viewing angle.

It is yet another object of the invention to provide color shifting flakes which may be easily and economically utilized in colorants such as paints and inks for various applications.

To achieve the forgoing objects, and in accordance with the invention as embodied and broadly described herein, pigment flakes are provided which can be used to produce colorant compositions having color shifting properties. The pigment flakes can have a symmetrical coating structure on opposing sides of a reflector layer, can have an asymmetrical coating structure with all of the layers on one side of the reflector layer, or can be formed with one or more encapsulating coatings around a reflector layer. The coating structure includes a selective absorbing layer on one or more sides of the reflector layer, a dielectric layer on the selective absorbing layer, and an absorber layer on the dielectric layer. The pigment flakes exhibit a discrete color shift such that the pigment flakes have a first color at a first angle of incident light or viewing and a second color different from the first color at a second angle of incident light or viewing. The pigment flakes can be interspersed into liquid media such as paints or inks to form colorant compositions for subsequent application to objects or papers.

A nonsymmetrical foil is also provided which includes the coating structure of a reflector layer, a selective absorbing layer on the reflector layer, a dielectric layer on the selective absorbing layer, and an absorber layer on the dielectric layer.

These and other aspects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention is directed to optically variable pigment flakes and foils which exhibit enhanced color shifting properties. The pigment flakes and foils have substantial shifts in chroma and hue with changes in angle of incident light or viewing angle of an observer. Accordingly, the pigment flakes and foils exhibit a first color at a first angle of incident light or viewing and a second color different from the first color at a second angle of incident light or viewing. The pigment flakes can be interspersed into liquid media such as paints or inks to produce various color shifting colorant compositions for subsequent application to objects or papers.

Generally, the pigment flakes can have a symmetrical coating structure on opposing sides of a reflector layer, can have an asymmetrical coating structure with all of the layers on one side of the reflector layer, or can be formed with encapsulating coatings which surround a reflector layer core. The coating structure includes a selective absorbing layer on one or more sides of the reflector layer, a dielectric layer on the selective absorbing layer, and an absorber layer on the dielectric layer.

The color shifting foils of the invention have a nonsymmetrical thin film coating structure which includes a reflector layer, a selective absorbing layer on the reflector layer, a dielectric layer on the selective absorbing layer, and an absorber layer on the dielectric layer. Each of these layers in the coating structures of the flakes and foils of the invention will be discussed in further detail hereinafter.

The color shifting flakes and foils of the invention can be formed using conventional thin film fabrication techniques which are well known in the art of forming thin coating structures. Nonlimiting examples of such thin film fabrication techniques include physical vapor deposition (PVD), chemical vapor deposition (CVD), sputtering, plasma enhanced variations thereof, electrolysis deposition, and the like.

Figure 1:
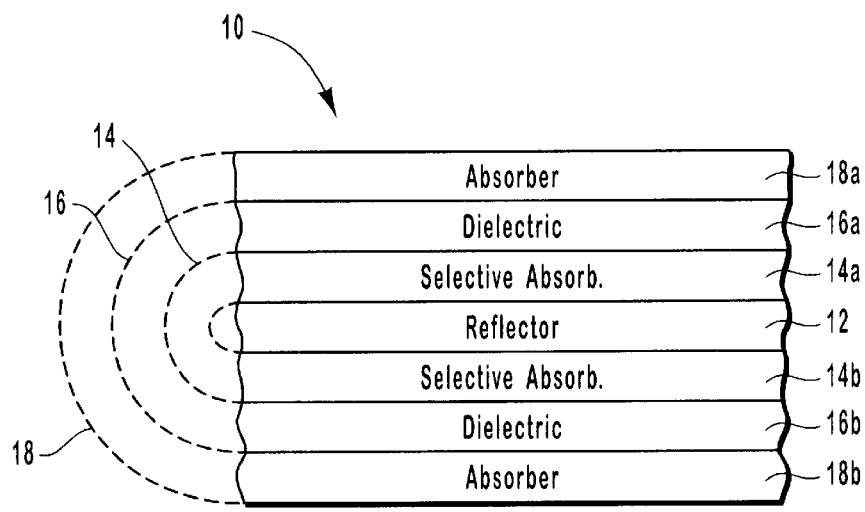
FIG. 1 is a schematic representation of the coating structure of a color shifting pigment flake according to one embodiment of the invention.

Referring to the drawings, wherein like structures are provided with like reference designations, FIG. 1 depicts a pigment flake 10 according to one embodiment of the invention which exhibits color shifting characteristics. The flake 10 is a seven-layer design having a generally symmetrical multilayer thin film structure on opposing sides of a reflector layer 12. Thus, first and second selective absorbing layers 14a and 14b are disposed on each side of reflector layer 12, first and second dielectric layers 16a and 16b are disposed respectively on each of selective absorbing layers 14a and 14b, and first and second absorber layers 18a and 18b are disposed respectively on each of dielectric layers 16a and 16b. Each of these layers in the coating structure of flake 10 will be discussed in further detail as follows.

The reflector layer 12 can be composed of various reflective metallic materials such as one or more metals, one or more metal alloys, or combinations thereof. Nonlimiting examples of suitable metallic materials for reflector layer 12 include aluminum, silver, copper, gold, platinum, tin, titanium, palladium, nickel, cobalt, rhodium, niobium, chromium, and combinations or alloys thereof. These can be selected based on the color effects desired. The reflector layer 12 can be formed to have a suitable physical thickness of about 200 angstroms (Å) to about 1000 Å, and preferably about 400 Å to about 700 Å.

Alternatively, reflector layer 12 can be a multi-layered structure, such as a "bright metal flake" as disclosed in U.S. Pat. No. 6,013,370 to Coulter et al., the disclosure of which is incorporated by reference herein. Such a multi-layered structure includes a central reflector layer such as a metal having a thickness of at least about 40 nm, and dielectric support layers on top and bottom surfaces of the reflector layer, the dielectric layers having a thickness of at least about 10 nm, with the thickness being chosen so that the dielectric layers do not substantially affect the color properties of the reflector layer. A complete description of these bright metal flakes can be found in the above-referenced patent to Coulter et al.

The first and second selective absorbing layers 14a and 14b, disposed on each side of reflector layer 12, can be composed of various materials that have one or more narrow absorption bands somewhere in the spectral region of about 380–780 nm, while being transparent or semi-transparent for the rest of the spectral region. These narrow absorption bands in absorbing layers 14a and 14b provide for an expanded color space over conventional color shifting pigments.

Suitable materials for selective absorbing layers 14a and 14b have an absorption index (k) which is high in the blue spectral region (i.e., greater than about 1) and that decreases into the red spectral region (i.e., less than about 0.1). Nonlimiting examples of materials for forming selective absorbing layers 14a and 14b include various inorganic materials such as silicon, silicon carbide, aluminum antimonide, aluminum arsenide, iron oxides such as ferric oxide and ferrous oxide, copper oxide, manganese oxide, cadmium sulfide, cadmium selenide, zinc selenide, $AgGaSe_2$, $Bi_{12}GeO_{20}$, titanium silicide, tantalum silicide, tungsten silicide, combinations thereof, and the like.

Alternatively, the selective absorbing layers can be composed of an organic dye material, preferably dyes with an absorption band in the visible spectrum, such as conjugated polymers and organic dyestuff molecules containing chromophores and auxochromes, including, but not limited to basic or cationic dyes; acid and premetalized dyes; chrome and mordant dyes; direct and developed direct dyes; sulfur, azoic, vat, disperse, and reactive dyes; combinations of any of the above dyes, and the like. The organic dye material must be capable of being deposited at an appropriate thickness which will allow a color shift, since the selective absorbing layer is part of the dielectric thickness in the spectral region where the selective absorbing layer is nonabsorbing.

One preferred material for the selective absorbing layers is silicon, which absorbs strongly in the blue spectral region and is semi-transparent to transparent for the rest of spectral region. A blue absorption property reduces the blue peak found in conventional color shifting pigments, thereby causing a change in colors such as magentas which become reds and pinks. The change in color will depend on the absorption spectral band location and width for the selective absorbing material, as well as the original design of the coating structure of the flake.

The selective absorbing layers can each be formed to have a physical thickness of about 50 Å to about 2000 Å, and preferably about 100 Å to about 200 Å. It should be noted that the amount of oxygen in the selective absorbing layer will affect the thickness needed for such a layer in a particular embodiment. The selective absorbing layers can each be formed of the same material or a different material, and can have the same or different physical thickness for each layer.

The first and second dielectric layers 16a and 16b can be formed of any dielectric material suitable for coating processes. The dielectric material can be a low index material, i.e., a material having an index of refraction of about 1.65 or less, or a high index material, i.e., a material having an index of refraction of greater than about 1.65.

Each of the dielectric layers can be formed of a single material or with a variety of material combinations and configurations. For example, the dielectric layers can be formed of only a low index material or only a high index material, a mixture or multiple sublayers of two or more low index materials, a mixture or multiple sublayers of two or more high index materials, or a mixture or multiple sublayers of low index and high index materials. In addition, the dielectric layers can be formed partially or entirely of high/low dielectric optical stacks, which are discussed in further detail below. When a dielectric layer is formed partially with a dielectric optical stack, the remaining portion of the dielectric layer can be formed with a single material or various material combinations and configurations as described above.

Examples of suitable low index dielectric materials include silicon dioxide, aluminum oxide, magnesium fluoride, aluminum fluoride, cerium fluoride, lanthanum fluoride, neodymium fluoride, samarium fluoride, barium fluoride, calcium fluoride, lithium fluoride, and combinations thereof.

Examples of suitable high index dielectric materials include zinc sulfide, zinc oxide, zirconium oxide, titanium dioxide, carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

It should be appreciated that several of the above-listed dielectric materials are typically present in non-stoichiometric forms, often depending upon the specific method used to deposit the dielectric material as a coating layer, and that the above-listed compound names indicate the approximate stoichiometry. For example, silicon monoxide and silicon dioxide have nominal 1:1 and 1:2 silicon::oxygen ratios, respectively, but the actual silicon:oxygen ratio of a particular dielectric coating layer varies somewhat from these nominal values. Such non-stoichiometric dielectric materials are also within the scope of the present invention.

The dielectric layers 16a and 16b are formed to have an appropriate optical thickness to achieve a desired color characteristic. The optical thickness is a well known optical parameter defined as the product nd, where n is the refractive index of the layer and d is the physical thickness of the layer. Typically, the optical thickness of a layer is expressed in terms of a quarter wave optical thickness (QWOT) which is equal to 4nd/λ, where λ is the wavelength at which a QWOT condition occurs. The optical thickness for each of dielectric layers 16a and 16b can range from about 2 QWOT at a design wavelength of about 400 nm to about 9 QWOT at a design wavelength of about 700 nm, depending upon the color shift desired. The dielectric layers will typically have a physical thickness of about 200 nm to about 800 nm if low index dielectric materials are used, and will be down to about 100 nm if high index dielectric materials are used.

It should be noted that the refractive index for a given material is not necessarily a constant. The refractive index of a given material can vary depending upon what other material it is placed upon and can also vary with thickness. It has been found that the selective absorbing layers adjacent to the dielectric layers in the pigment designs of the invention act as dielectrics in the non-absorbing regions of the color spectrum. This effectively increases the overall dielectric thickness in the pigment designs, resulting in a shift of the response peak to longer wavelengths. The response peak shift will depend on the refractive index of the selective absorbing layer. Accordingly, if desired, the dielectric layers can be made thinner in order to compensate for the effective increase in dielectric thickness provided by the selective absorbing layers.

The dielectric layers 16a and 16b can each be composed of the same material or a different material, and can have the same or different optical or physical thickness for each layer. It will be appreciated that when the dielectric layers are composed of different materials or have different thicknesses, the flakes exhibit different colors on each side thereof and the resulting mix of flakes in a pigment or paint mixture would show a new color which is the combination of the two colors. The resulting color would be based on additive color theory of the two colors coming from the two sides of the flakes. In a multiplicity of flakes, the resulting color would be the additive sum of the two colors resulting from the random distribution of flakes having different sides oriented toward the observer.

As mentioned above, the dielectric layers can be formed of high/low dielectric optical stacks, which have alternating layers of low index (L) and high index (H) materials. When a dielectric layer is formed of a high/low dielectric stack, the color shift at angle will depend on the combined refractive index of the layers in the stack. Examples of suitable stack configurations for the dielectric layers include LH, HL, LHL, HLH, HLHL, LHLH, as well as various multiples and combinations thereof. In these stacks, LH, for example, indicates discrete layers of a low index material and a high index material. In an alternative embodiment, the high/low dielectric stacks are formed with a gradient index of refraction. For example, the stack can be formed with layers having a graded index low-to-high, a graded index high-to-low, a graded index low-to-high-to-low, a graded index high-to-low-to-high, as well as combinations and multiples thereof. The graded index is produced by a gradual variance in the refractive index, such as low-to-high index or high-to-low index, of adjacent layers. The graded index of the layers can be produced by changing gases during deposition or co-depositing two materials (e.g., L and H) in differing proportions. Various dielectric stacks can be used to enhance color shifting performance and to change the possible color space of the pigments of the invention.

The first and second absorber layers 18a and 18b, disposed on each of dielectric layers 16a and 16b, can be composed of any absorber material having the desired absorption properties, including both selective absorbing materials and nonselective absorbing materials. For example, the absorber layers can be formed of nonselective absorbing metallic materials deposited to a thickness at which the absorber layer is at least partially absorbing, or semi-opaque. Nonlimiting examples of suitable absorber materials include metallic absorbers such as chromium, aluminum, nickel, palladium, platinum, titanium, vanadium, cobalt, iron, tin, tungsten, molybdenum, rhodium, niobium, as well as other absorbers such as carbon, graphite, silicon, germanium, cermet, ferric oxide or other metal oxides, metals mixed in a dielectric matrix, and combinations, mixtures, compounds, or alloys thereof.

Examples of suitable alloys of the above absorber materials include Inconel (Ni—Cr—Fe), and titanium-based alloys, such as titanium mixed with carbon (Ti/C), titanium mixed with tungsten (Ti/W), titanium mixed with niobium (Ti/Nb), and titanium mixed with silicon (Ti/Si). Examples of suitable compounds for the absorber layers include titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), and titanium boride ($TiB_2$). In the case of $TiN_xO_y$ and $TiN_xO_yC_z$, preferably x=0 to 1, y=0 to 1, and z=0 to 1, where x+y=1 in $TiN_xO_y$ and x+y+z=1 in $TiN_xO_yC_z$. For $TiN_xC_z$, preferably x=0 to 1 and z=0 to 1, where x+z=1. Alternatively, the absorber layers can be composed of a titanium-based alloy disposed in a matrix of Ti, or can be composed of Ti disposed in a matrix of a titanium-based alloy.

The absorber layers 18a and 18b generally have a physical thickness in the range from about 30 Å to about 500 Å, depending upon the optical constants of the absorber layer material and the desired peak shift. The absorber layers 18a and 18b can each be formed from the same material or a different material, and can have the same or different physical thickness for each layer.

FIG. 1 further depicts an alternative coating structure (with phantom lines) for color shifting flake 10 according to another embodiment of the invention. In this embodiment, one or more of the absorber layer, dielectric layer, and selective absorbing layer are coated around reflector layer 12 in an encapsulation process. For example, when an encapsulation process is used for the absorber layer, absorber layers 18a and 18b are formed as part of a continuous coating layer 18 substantially surrounding the flake structure thereunder. Likewise, an encapsulation process can also be used in forming the dielectric layer, such that dielectric layers 16a and 16b are formed as part of a continuous coating layer 16 substantially surrounding the flake structure thereunder. An encapsulation process can also be used in forming the selective absorbing layer, such that selective absorbing layers 14a and 14b are formed as part of a continuous coating layer 14 substantially surrounding reflector layer 12.

Accordingly, a color shifting pigment flake in which all of the coating layers are formed by encapsulation includes at least one reflector layer 12, a selective absorbing layer 14 substantially surrounding reflector layer 12, a dielectric layer 16 substantially surrounding selective absorbing layer 14, and an absorber layer 18 substantially surrounding dielectric layer 16.

A color shifting pigment flake in which one or more of the coating layers are formed by encapsulation includes a core flake section with at least one reflector layer 12 having a top surface, a bottom surface, and at least one side surface, and selective absorbing layers 14a and 14b preformed on the top and bottom surfaces but not on the at least one side surface of reflector layer 12. A dielectric coating layer 16 can be formed to substantially surround the core flake section, or two opposing dielectric layers 16a and 16b can be formed on selective absorbing layers 14a and 14b. An absorber coating layer 18 is then formed to substantially surround the underlying flake structure.

Figure 2:
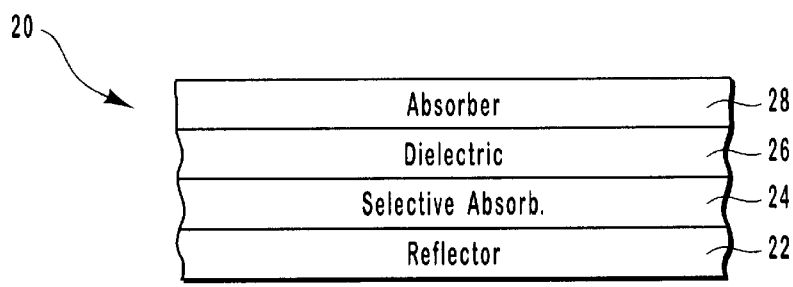
FIG. 2 is a schematic representation of the coating structure of a color shifting pigment flake according to another embodiment of the invention.

FIG. 2 depicts a coating structure of a color shifting flake 20 according to another embodiment of the invention. The flake 20 is a four-layer design having an asymmetrical multilayer thin film structure which includes similar layers as one side of flake 10 discussed previously. Accordingly, flake 20 includes a reflector layer 22, a selective absorbing layer 24 on reflector layer 22, a dielectric layer 26 on selective absorbing layer 24, and an absorber layer 28 on dielectric layer 26. Each of these layers can be composed of the same materials and have the same thicknesses as described above for the corresponding layers of flake 10.

The color shifting pigment flakes of the invention such as flakes 10 and 20 can be formed by various fabrication methods. For example, the pigment flakes can be formed by a web coating process. In such a process, the various layers as described above are sequentially deposited on a web material by conventional deposition techniques to form a thin film structure, which is subsequently fractured and removed from the web such as by use of a solvent to form a plurality of thin film flakes. The thin film structure can be formed on the web material in a conventional manner, such as described in U.S. Pat. No. 5,135,812, the disclosure of which is incorporated by reference herein. The pigment flakes can be further fragmented if desired by, for example, grinding the flakes to a desired size using an air grind, such that each of the pigment flakes has a dimension on any surface thereof ranging from about 2 microns to about 200 microns.

In another fabrication method, one or more layers of the above described layers including at least the reflector layer is deposited on a web to form a film, which is subsequently fractured and removed from the web to form a plurality of pigment preflakes. The preflakes can be fragmented further by grinding if desired. The preflakes are then coated with the remaining layers in a sequential encapsulation process to form a plurality of pigment flakes.

In an alternative fabrication method, reflective particles can be coated with the above described layers in a sequential encapsulation process to form a plurality of pigment flakes. When an encapsulation process is used for forming the outer layers of the flakes, it will be appreciated that each respective encapsulating layer is a continuous layer composed of one material and having substantially the same thickness around the flake structure.

Various coating processes can be utilized in forming the dielectric and absorber coating layers by encapsulation. For example, suitable preferred methods for forming the dielectric layer include vacuum vapor deposition, sol-gel hydrolysis, CVD in a fluidized bed, and electrochemical deposition. Suitable preferred methods for forming the absorber layers include vacuum vapor deposition, and sputtering onto a mechanically vibrating bed of particles, as disclosed in commonly assigned copending patent application Ser. No. 09/389,962, filed Sep. 3, 1999, entitled "Methods and Apparatus for Producing Enhanced Interference Pigments," which is incorporated by reference herein in its entirety. Alternatively, the absorber coating may be deposited by decomposition through pyrolysis of metal-organo compounds or related CVD processes which may be carried out in a fluidized bed as described in U.S. Pat. Nos. 5,364,467 and 5,763,086 to Schmid et al., the disclosures of which are incorporated by reference herein. If no further grinding is carried out, these methods result in an encapsulated core flake section with dielectric and absorber materials therearound. Various combinations of the above coating processes may be utilized during manufacture of pigment flakes with multiple coatings therearound.

Some flakes of the invention can be characterized as multilayer thin film interference structures in which layers lie in parallel planes such that the flakes have first and second parallel planar outer surfaces and an edge thickness perpendicular to the first and second parallel planar outer surfaces. Such flakes are produced to have an aspect ratio of at least about 2:1, and preferably about 5–15:1 with a narrow particle size distribution. The aspect ratio of the flakes is ascertained by taking the ratio of the longest planar dimension of the first and second outer surfaces to the edge thickness dimension of the flakes.

In order to impart additional durability to the color shifting flakes, an annealing process can be employed to heat treat the flakes at a temperature ranging from about 200–300° C., and preferably from about 250–275° C., for a time period ranging from about 10 minutes to about 24 hours, and preferably a time period of about 15–60 minutes.

The color shifting pigment flakes of the present invention can be interspersed within a pigment medium to produce a colorant composition which can be applied to a wide variety of objects or papers. The pigment flakes added to a medium produces a predetermined optical response through radiation incident on a surface of the solidified medium. Suitable pigment media include various polymeric compositions or organic binders such as acrylic melamine, urethanes, polyesters, vinyl resins, acrylates, methyl methacrylate, ABS resins, epoxies, styrenes, ink and paint formulations based on alkyd resins, and mixtures thereof. The color shifting flakes combined with the pigment media produce a colorant composition that can be used directly as a paint, ink, or moldable plastic material. The colorant composition can also be utilized as an additive to conventional paint, ink, or plastic materials.

In addition, the color shifting flakes can be optionally blended with various additive materials such as conventional pigment flakes, particles, or dyes of different hues, chroma and brightness to achieve the color characteristics desired. For example, the flakes can be mixed with other conventional pigments, either of the interference type or noninterference type, to produce a range of other colors. This preblended composition can then be dispersed into a polymeric medium such as a paint, ink, plastic or other polymeric pigment vehicle for use in a conventional manner.

Examples of suitable additive materials that can be combined with the color shifting flakes of the invention include non-color shifting high chroma or high reflective platelets which produce unique color effects, such as $MgF_2/Al/MgF_2$ platelets or $SiO_2/Al/SiO_2$ platelets. Other suitable additives that can be mixed with the color shifting flakes include lamellar pigments such as aluminum flakes, graphite flakes, glass flakes, iron oxide, boron nitride, mica flakes, interference based $TiO_2$ coated mica flakes, interference pigments based on multiple coated plate-like silicatic substrates, metal-dielectric or all-dielectric interference pigments, and the like; and non-lamellar pigments such as aluminum powder, carbon black, ultramarine blue, cobalt based pigments, organic pigments or dyes, rutile or spinel based inorganic pigments, naturally occurring pigments, inorganic pigments such as titanium dioxide, talc, china clay, and the like; as well as various mixtures thereof. For example, pigments such as aluminum powder or carbon black can be added to control lightness and other color properties.

The color shifting flakes of the present invention are particularly suited for use in applications where colorants of high chroma and durability are desired. By using the color shifting flakes in a colorant composition, high chroma durable paint or ink can be produced in which variable color effects are noticeable to the human eye. The color shifting flakes of the invention have a wide range of color shifting properties, including large shifts in chroma (degree of color purity) and also large shifts in hue (relative color) with a varying angle of view. Thus, an object colored with a paint containing the color shifting flakes of the invention will change color depending upon variations in the viewing angle or the angle of the object relative to the viewing eye. By way of example, color shifts which can be achieved utilizing the pigment flakes of the invention include pink-to-green, green-to-pink, orange-to-gold, purple-to-red, pink-to-gold, silver-to-green, cyan-to-pink, and gold-to-green.

The color shifting flakes of the invention can be easily and economically utilized in paints and inks which can be applied to various objects or papers, such as motorized vehicles, currency and security documents, household appliances, architectural structures, flooring, fabrics, sporting goods, electronic packaging/housing, toys, product packaging, etc. The color shifting flakes can also be utilized in forming colored plastic materials, coating compositions, extrusions, electrostatic coatings, glass, and ceramic materials.

Figure 3:
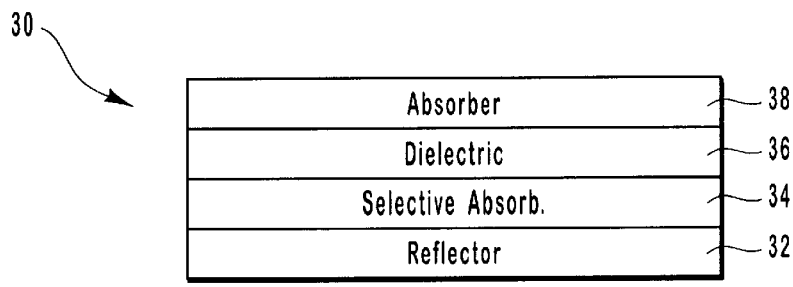
FIG. 3 is a schematic representation of the coating structure of a color shifting foil according to a further embodiment of the invention.

FIG. 3 depicts a coating structure of a color shifting foil 30 according to another embodiment of the invention. The foil 30 is an asymmetrical multilayer thin film structure which has essentially the same layer structure as flake 20 discussed previously. Accordingly, foil 30 includes a reflector layer 32, a selective absorbing layer 34 on reflector layer 32, a dielectric layer 36 on selective absorbing layer 34, and an absorber layer 38 on dielectric layer 36. Each of these layers can be composed of the same materials and have the same thicknesses as described above for the corresponding layers of flakes 10 and 20.

The foil 30 can be formed by a web coating process, with the various layers as described above sequentially deposited on a web material by conventional deposition techniques to form a thin film foil structure. The foil 30 can also be formed on a carrier substrate, or can be formed on a release layer so that the foil can be subsequently attached to a surface of an object.

Figure 4A:
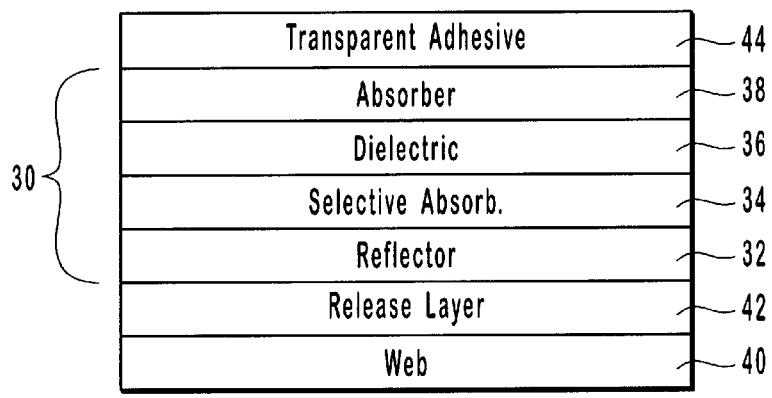
FIGS. 4A and 4B are alternative schematic configurations of the foil of FIG. 3 formed on a web.

For example, FIG. 4A illustrates one embodiment of foil 30 disposed on a web 40 having an optional release layer 42 on which is deposited reflector layer 32. The foil 30 may be utilized attached to web 40 as a carrier when a release layer is not employed. Alternatively, foil 30 may be laminated to a transparent substrate (not shown) via an optional transparent adhesive 44 when the release layer is used.

Figure 4B:
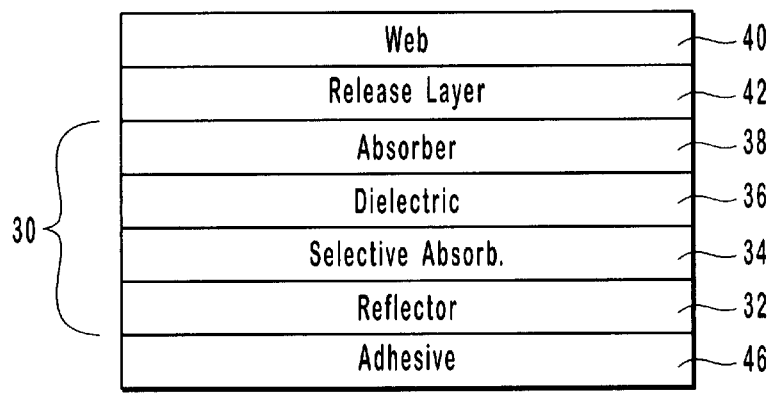

FIG. 4B depicts an alternative embodiment of foil 30 in which absorber layer 38 is disposed on web 40 having an optional release layer 42. The foil 30 may be utilized attached to web 40 as a carrier, which is preferably transparent, when a release layer is not employed. The foil 30 may also be attached to a substrate (not shown) when the release layer is used, via an adhesive 46 such as a hot stampable adhesive, a pressure sensitive adhesive, a permanent adhesive, and the like.

The color shifting flakes and foils of the invention provide the benefit of an increase in productivity due to the reduction in the thickness of the dielectric layer, which can be replaced by a metallic or other selective absorbing layer. Since metals can generally be deposited at higher rates than a dielectric material, the replacement of some thickness of the dielectric layer with a metal offers the potential for lower manufacturing costs.

The following examples are given to illustrate the present invention, and are not intended to limit the scope of the invention.

EXAMPLES

In order to quantify the color characteristics of a particular object, it is useful to invoke the L*a*b* color coordinate system developed by the Commission Internationale de l'Eclairage (CIE), which is now used as a standard in the industry in order to precisely describe color values. In this system, L* indicates lightness and a* and b* are the chromaticity coordinates. In one example which follows, the color characteristics of a pigment of the present invention is compared with a conventional pigment in terms of L*, chroma (C*) which corresponds to color purity, and hue (h) which corresponds to color variation with changing angle.

The L*a*b*color system allows for a comparison of the color differences between two measurements through the parameter $\Delta E_{ab}$, which indicates the change in color as measured in the L*a*b* color space, such as the color difference of two different pigment designs. The numerical value for $\Delta E_{ab}$ is calculated through the following equation using the measured L*a*b* values:

$$\Delta E_{ab} = [(\Delta L^*)^2 + (\Delta a^*)^2 + (\Delta b^*)^2]^{1/2}$$

where the symbol $\Delta$ denotes the difference in measurements being compared.

Example 1

A conventional color shifting pigment having a five layer design of Cr/SiO$_2$/Al/SiO$_2$/Cr was compared to a seven layer design for a pigment of the invention having the coating structure Cr/SiO$_2$/Si/Al/Si/SiO$_2$/Cr. The chromium absorber layers in each design had a physical thickness of 55 Å, the SiO2 dielectric layers had an optical thickness of 4 QWOT at 650 nm, and the aluminum reflector layers in each design had a physical thickness of 400 Å. The silicon selective absorbing layers on each side of the reflector layer in the seven layer design of the invention had a physical thickness of 180 Å.

Figure 5:
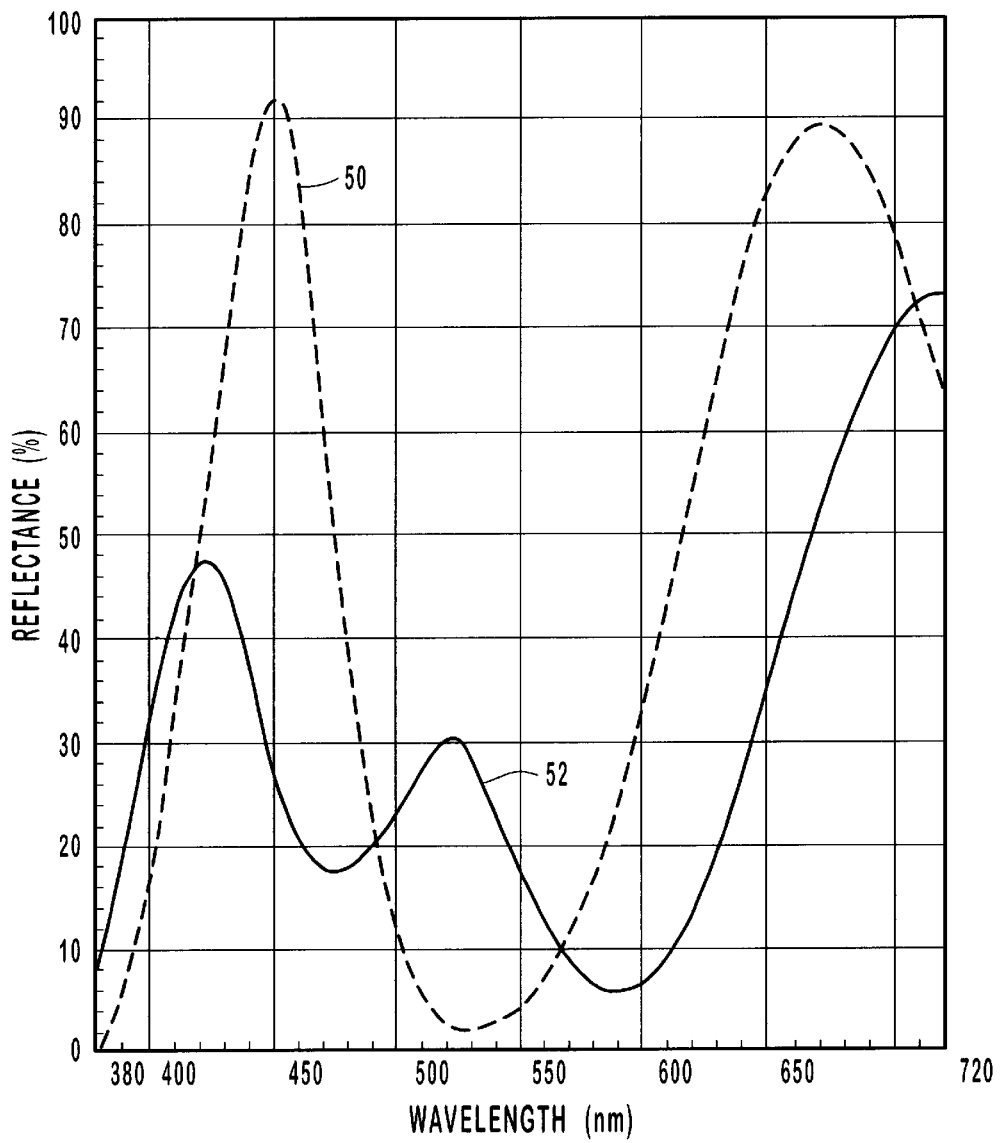
FIG. 5 is a graph showing theoretical plots of reflectance as a function of wavelength for a conventional pigment and a pigment of the invention.

FIG. 5 is a graph showing theoretical plots of reflectance as a function of wavelength, with plot line 50 corresponding to the conventional five layer design and plot line 52 corresponding to the seven layer design of Example 1. The graph of FIG. 5 gives an indication of the theoretical effect of adding the silicon selective absorbing layer on each side of the reflector layer in the seven layer design, indicating increased absorption in the blue color region (380–500 nm) of the spectrum, thereby allowing color shift combinations that are different from the color shifts in a conventional five layer design.

Example 2

The conventional color shifting pigment described in Example 1 was compared to a seven layer design for a pigment of the invention having the coating structure Cr/SiO$_2$/Si/Al/Si/SiO$_2$/Cr. The seven layer design was similar to the design of Example 1, including chromium absorber layers at 55 Å, silicon selective absorbing layers at 180 Å, and an aluminum reflector layer at 400 Å, but had a reduced optical thickness for the SiO$_2$ dielectric layers of 4 QWOT at 600 nm.

Figure 6:
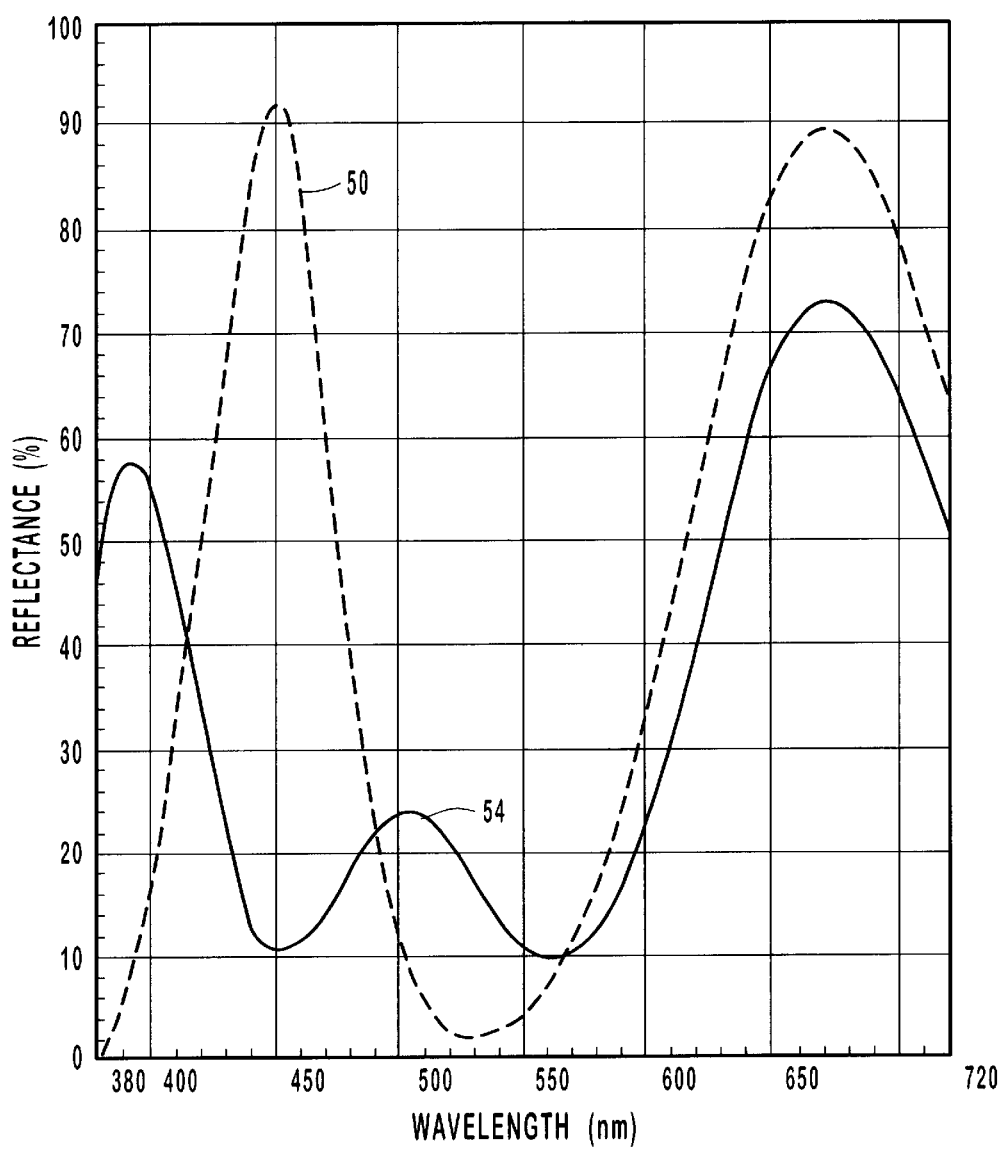
FIG. 6 is a graph showing theoretical plots of reflectance as a function of wavelength for a conventional pigment and a pigment of the invention.

FIG. 6 is a graph showing theoretical plots of reflectance as a function of wavelength, with plot line 50 corresponding to the conventional five layer design and plot line 54 corresponding to the seven layer design of Example 2. The graph of FIG. 6 shows that the seven layer design with the reduced optical thickness for the dielectric layers is shifted down so that it has the same peak value at 675 nm as the five layer design.

Example 3

A conventional color shifting pigment having a magenta-to-green color shift (hereinafter "M/G OVP") was compared to a seven layer pigment of the invention having the coating structure Cr/SiO$_2$/Si/Al/Si/SiO$_2$/Cr using the L*a*b*color system described above. The seven layer design had the following layer thicknesses: chromium absorber layers at 55 Å; SiO$_2$ dielectric layers of 4 QWOT at 600 nm; silicon selective absorbing layers at 180 Å; and aluminum reflector layer at 400 Å. The seven layer pigment exhibited a pink-to-green color shift.

Table 1 below lists the color data generated for the M/G OVP pigment and the seven layer pigment of the invention (7-layer), including the values measured for L*, a*, b*, C*, and h, along with the change in each of these values ($\Delta$) between the M/G OVP pigment and the seven layer pigment. The illuminant/observer conditions used in generating the data in Table 1 included a light source of $\Delta$65 10 deg (6500 K black body light source at 10 degrees) for illuminating a sample.

The numerical value for $\Delta E_{ab}$, indicating the change in color for the two pigments, was calculated from the L*a*b* values in Table 1 to be 25.92. Since the M/G OVP pigment and the seven layer pigment of the invention have similar dielectric layer thicknesses, the color difference is due to the silicon layers of the seven layer pigment which absorb in the blue region.

TABLE 1

|     | M/G OVP | 7-Layer | Δ      |
| --- | ------- | ------- | ------ |
| L*  | 51.11   | 55.26   | 4.15   |
| A*  | 42.58   | 43.02   | 0.44   |
| B*  | −33.42  | −7.84   | 25.58  |
| C*  | 54.13   | 43.73   | −10.40 |
| H   | 321.87  | 349.67  | 23.37  |

Figure 7:
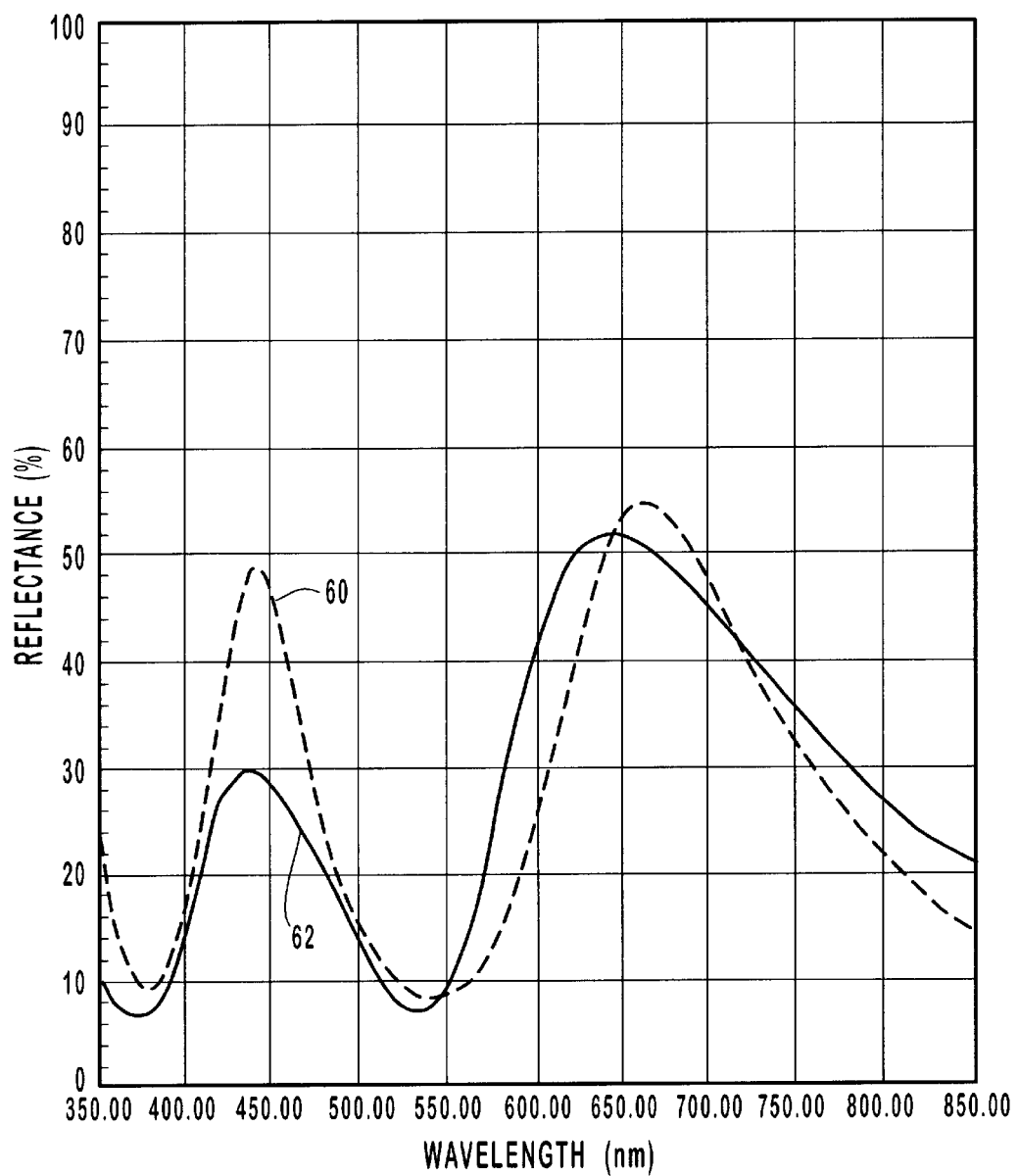
FIG. 7 is a graph showing plots of reflectance as a function of wavelength for a conventional pigment and a pigment made according to the present invention.

FIG. 7 is a graph showing reflectance as a function of wavelength, with plot line 60 corresponding to the M/G OVP pigment and plot line 62 corresponding to the seven layer design of Example 3. As shown in the graph of FIG. 7, the seven layer pigment had reduced reflectance in the blue region (i.e., increased absorption) compared to the M/G OVP pigment.

Example 4

The optical effect of a selective absorbing layer such as a silicon layer placed on a reflector layer such as an aluminum layer was analyzed. Silicon layers at three different thicknesses were analyzed, including silicon layers at 50 Å, 100 Å, and 150 Å. A gold reflection is produced by the silicon layers on aluminum.

Figure 8:
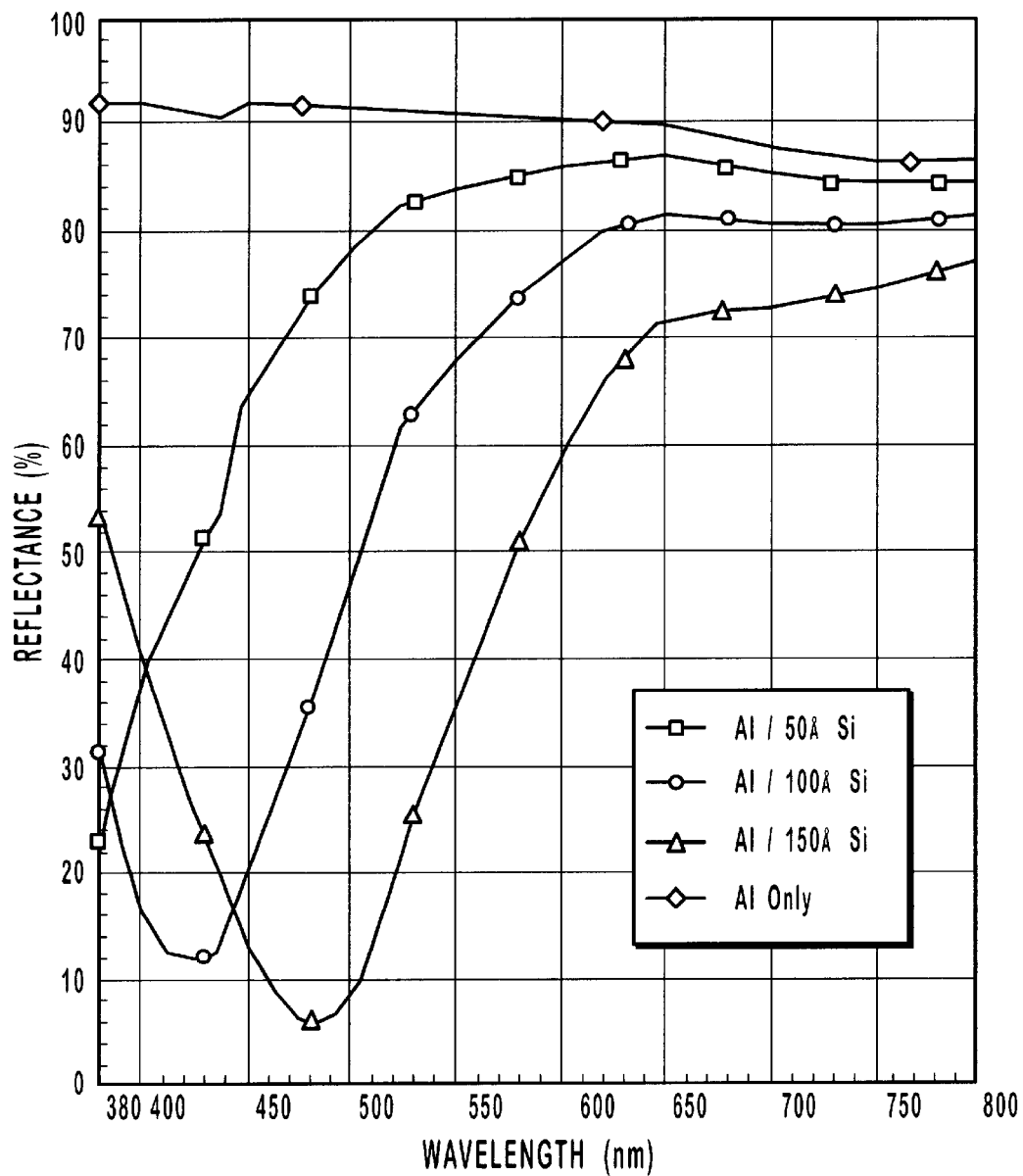
FIG. 8 is a graph showing theoretical plots of reflectance as a function of wavelength for various silicon layers on aluminum, and for an aluminum layer without a silicon layer.

FIG. 8 is a graph showing theoretical plots of reflectance as a function of wavelength for each of the 50 Å, 100 Å, and 150 Å silicon layers on aluminum, as well as for an aluminum layer without the silicon layer. To determine the effect of the silicon layers, the color spectral region was split into two parts, a 380–500 nm part and a 550–780 nm part. As shown in the graph of FIG. 8, the silicon layers are very absorbing (i.e., lower reflectance) in the blue color region (380–500 nm) so that the aluminum reflector is no longer much of a reflector in the blue color region. For the 550–780 nm part of the color spectral region, the silicon layers have much less absorption (i.e., allow higher reflectance).

Example 5

A conventional color shifting pigment having a five layer design of Cr/SiO$_2$/Al/SiO$_2$/Cr was compared to various seven layer pigment designs according to the invention having the coating structure Cr/SiO$_2$/Si/Al/Si/SiO$_2$/Cr. The thickness of the silicon layers in the seven layer designs were varied to include silicon layers with a thickness of 50 Å, 100 Å, and 150 Å. The thickness of the SiO$_2$ dielectric layers in each of the seven layer designs was reduced a corresponding amount to maintain the response peaks thereof at the same wavelength as the five layer design, since the silicon layers effectively increase the overall dielectric thickness of the seven layer designs. As discussed previously, an increased dielectric thickness shifts the response peak to longer wavelengths.

Figure 9:
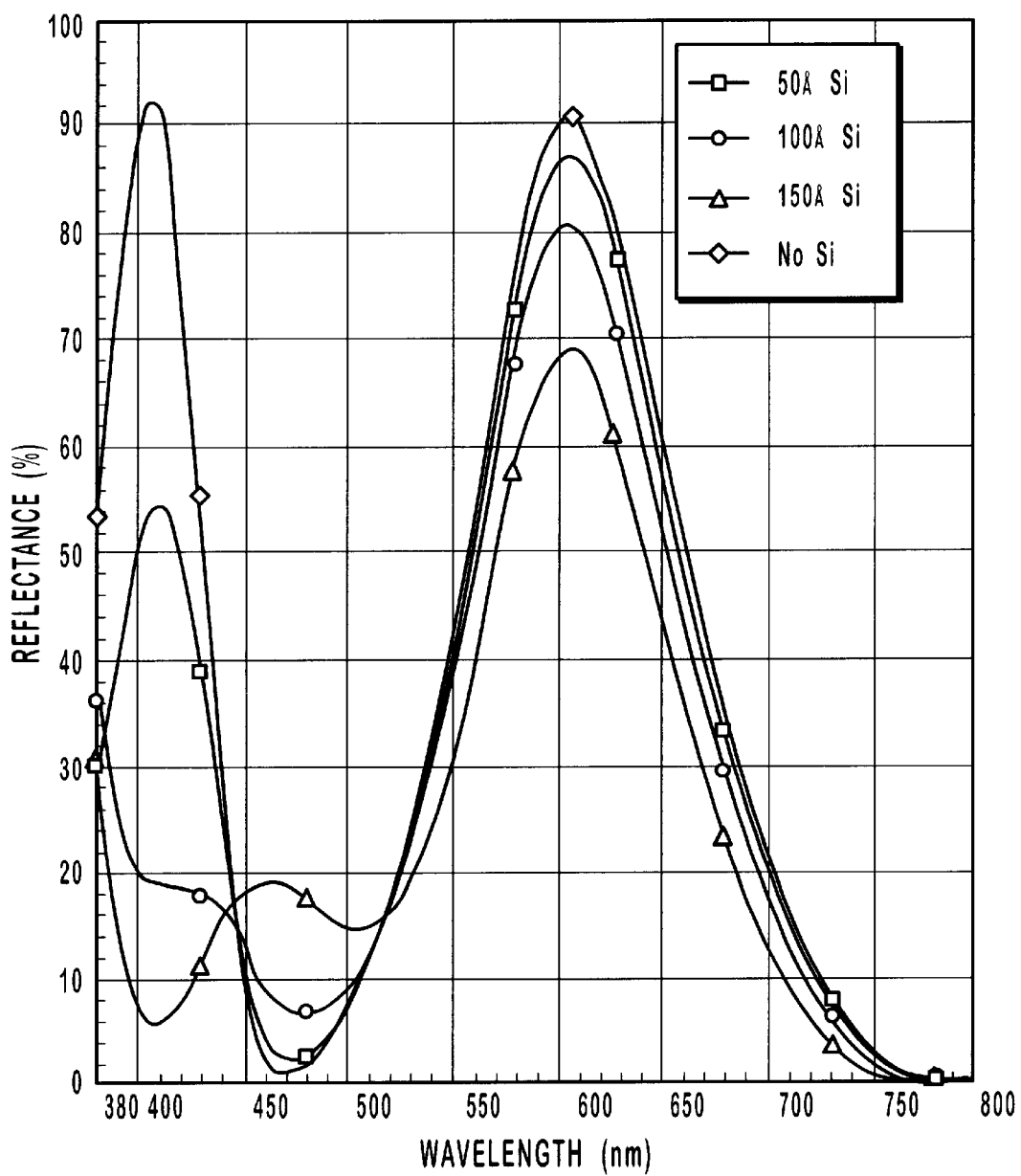
FIG. 9 is a graph showing theoretical plots of reflectance as a function of wavelength for pigment designs of the invention with various silicon layers, and for a conventional pigment.

FIG. 9 is a graph showing theoretical plots of reflectance as a function of wavelength for each of the seven layer designs with silicon layers of 50 Å, 100 Å, and 150 Å, as well as for the five layer design without silicon layers. The graph of FIG. 9 indicates how the thickness of the silicon layers affect the pigment design performance in that the thicker silicon layers have increasing absorbance in the blue region while having a lower performance in the red region.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A color shifting pigment flake, comprising:
   at least one reflector layer having a first surface and a second surface;
   a first selective absorbing layer on the first surface of the reflector layer;
   a first dielectric layer on the first selective absorbing layer; and
   a first absorber layer on the first dielectric layer;
   wherein the pigment flake exhibits a discrete color shift such that the pigment flake has a first color at a first angle of incident light or viewing and a second color different from the first color at a second angle of incident light or viewing.

2. The pigment flake of claim 1, further comprising:
   a second selective absorbing layer on the second surface of the reflector layer;
   a second dielectric layer on the second selective absorbing layer; and
   a second absorber layer on the second dielectric layer.

3. The pigment flake of claim 2, wherein the first and second absorber layers comprise a material selected from the group consisting of chromium, aluminum, nickel, palladium, platinum, titanium, vanadium, cobalt, iron, carbon, graphite, tin, tungsten, molybdenum, rhodium, niobium, and combinations or alloys thereof.

4. The pigment flake of claim 2, wherein the first and second absorber layers each have a physical thickness of about 30 Å to about 500 Å.

5. The pigment flake of claim 2, wherein the first and second absorber layers have the same physical thickness.

6. The pigment flake of claim 2, wherein the first and second absorber layers are composed of the same material.

7. The pigment flake of claim 1, wherein the first absorber layer is composed of a selectively absorbing material.

8. The pigment flake of claim 2, wherein the second absorber layer is composed of a selectively absorbing material.

9. The pigment flake of claim 2, wherein the first and second dielectric layers comprise a dielectric material having an index of refraction of about 1.65 or less.

10. The pigment flake of claim 9, wherein the dielectric material is selected from the group consisting of silicon dioxide, aluminum oxide, magnesium fluoride, aluminum fluoride, cerium fluoride, lanthanum fluoride, neodymium fluoride, samarium fluoride, barium fluoride, calcium fluoride, lithium fluoride, and combinations thereof.

11. The pigment flake of claim 2, wherein the first and second dielectric layers comprise a dielectric material having an index of refraction of greater than about 1.65.

12. The pigment flake of claim 11, wherein the dielectric material is selected from the group consisting of zinc sulfide, zinc oxide, zirconium oxide, titanium dioxide, carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

13. The pigment flake of claim 2, wherein the first and second dielectric layers have an optical thickness in a range from about 2 QWOT at a design wavelength of about 400 nm to about 9 QWOT at a design wavelength of about 700 nm.

14. The pigment flake of claim 2, wherein the first and second dielectric layers have the same optical thickness and are composed of the same material.

15. The pigment flake of claim 2, wherein the first and second dielectric layers are each composed of a dielectric optical stack having a plurality of alternating layers of a high index material and a low index material.

16. The pigment flake of claim 15, wherein the dielectric optical stack has a gradient index of refraction.

17. The pigment flake of claim 2, wherein the first and second dielectric layers are each composed of a mixture or multiple sublayers of dielectric materials selected from the group consisting of low index materials, high index materials, and combinations thereof.

18. The pigment flake of claim 2, wherein the first and second selective absorbing layers comprise an inorganic material selected from the group consisting of silicon, silicon carbide, aluminum antimonide, aluminum arsenide, iron oxides, copper oxide, manganese oxide, cadmium sulfide, cadmium selenide, zinc selenide, AgGaSe$_2$, Bi$_{12}$GeO$_{20}$, titanium silicide, tantalum silicide, tungsten silicide, and combinations thereof.

19. The pigment flake of claim 2, wherein the first and second selective absorbing layers comprise an organic dye material.

20. The pigment flake of claim 19, wherein the organic dye material is selected from the group consisting of conjugated polymers, organic dyestuff molecules containing chromophores and auxochromes, basic or cationic dyes, acid and premetalized dyes, chrome and mordant dyes, direct and developed direct dyes, sulfur dyes, azoic dyes, vat dyes, disperse dyes, reactive dyes, and combinations thereof.

21. The pigment flake of claim 2, wherein the first and second selective absorbing layers each have a physical thickness of about 50 Å to about 2000 Å.

22. The pigment flake of claim 2, wherein the first and second selective absorbing layers have the same physical thickness.

23. The pigment flake of claim 2, wherein the first and second selective absorbing layers are composed of the same material.

24. The pigment flake of claim 1, wherein the reflector layer comprises a reflective material selected from the group consisting of aluminum, silver, copper, gold, platinum, tin, titanium, palladium, nickel, cobalt, rhodium, niobium, chromium, and combinations or alloys thereof.

25. The pigment flake of claim 1, wherein the reflector layer has a physical thickness of about 200 Å to about 1000 Å.

26. A color shifting pigment flake, comprising:
a first absorber layer;
a first dielectric layer on the first absorber layer;
a first selective absorbing layer on the first dielectric layer;
a reflector layer on the first selective absorbing layer;
a second selective absorbing layer on the reflector layer;
a second dielectric layer on the second selective absorbing layer; and
a second absorber layer on the second dielectric layer;
wherein the pigment flake exhibits a discrete color shift such that the pigment flake has a first color at a first angle of incident light or viewing and a second color different from the first color at a second angle of incident light or viewing.

27. A color shifting pigment flake, comprising:
at least one reflector layer;
a selective absorbing layer substantially surrounding the reflector layer;
a dielectric layer substantially surrounding the selective absorbing layer; and
an absorber layer substantially surrounding the dielectric layer;
wherein the pigment flake exhibits a discrete color shift such that the pigment flake has a first color at a first angle of incident light or viewing and a second color different from the first color at a second angle of incident light or viewing.

28. The pigment flake of claim 27, wherein the absorber layer is composed of a selectively absorbing material.

29. The pigment flake of claim 27, wherein the absorber layer is composed of a nonselectively absorbing material.

30. A color shifting pigment flake, comprising:
a core flake section including at least one reflector layer having a top surface, a bottom surface, and at least one side surface, and opposing selective absorbing layers preformed on the top and bottom surfaces but not on the at least one side surface of reflector layer;
a dielectric layer substantially surrounding the core flake section; and
an absorber layer substantially surrounding the dielectric layer;
wherein the pigment flake exhibits a discrete color shift such that the pigment flake has a first color at a first angle of incident light or viewing and a second color different from the first color at a second angle of incident light or viewing.

31. A color shifting foil, comprising:
a reflector layer;
a selective absorbing layer on the reflector layer;
a dielectric layer on the selective absorbing layer; and
an absorber layer on the dielectric layer;
wherein the foil exhibits a discrete color shift such that the foil has a first color at a first angle of incident light or viewing and a second color different from the first color at a second angle of incident light or viewing.

32. The foil of claim 31, further comprising a web carrier with either the reflector layer or the absorber layer on the web carrier.

33. The foil of claim 32, wherein the web carrier further comprises a release layer thereon disposed between the web carrier and the reflector layer, or the web carrier and the absorber layer.

34. The foil of claim 33, further comprising an adhesive for laminating the foil to a substrate.

35. The foil of claim 34, wherein the adhesive is selected from the group consisting of a hot stampable adhesive, a pressure sensitive adhesive, a permanent adhesive, and a transparent adhesive.

36. The foil of claim 31, wherein the reflector layer comprises a reflective material selected from the group consisting of aluminum, silver, copper, gold, platinum, tin, titanium, palladium, nickel, cobalt, rhodium, niobium, chromium, and combinations or alloys thereof.

37. The foil of claim 31, wherein the reflector layer has a physical thickness of about 200 Å to about 1000 Å.

38. The foil of claim 31, wherein the selective absorbing layer comprises an inorganic material selected from the group consisting of silicon, silicon carbide, aluminum antimonide, aluminum arsenide, iron oxides, copper oxide, manganese oxide, cadmium sulfide, cadmium selenide, zinc selenide, $AgGaSe_2$, $Bi_{12}GeO_{20}$, titanium silicide, tantalum silicide, tungsten silicide, and combinations thereof.

39. The foil of claim 31, wherein the selective absorbing layer comprises an organic dye material.

40. The foil of claim 39, wherein the organic dye material is selected from the group consisting of conjugated polymers, organic dyestuff molecules containing chromophores and auxochromes, basic or cationic dyes, acid and premetalized dyes, chrome and mordant dyes, direct and developed direct dyes, sulfur dyes, azoic dyes, vat dyes, disperse dyes, reactive dyes, and combinations thereof.

41. The foil of claim 31, wherein the selective absorbing layer has a physical thickness of about 50 Å to about 2000 Å.

42. The foil of claim 31, wherein the dielectric layer comprises a dielectric material having an index of refraction of about 1.65 or less.

43. The foil of claim 42, wherein the dielectric material is selected from the group consisting of silicon dioxide, aluminum oxide, magnesium fluoride, aluminum fluoride, cerium fluoride, lanthanum fluoride, neodymium fluoride, samarium fluoride, barium fluoride, calcium fluoride, lithium fluoride, and combinations thereof.

44. The foil of claim 31, wherein the dielectric layer comprises a dielectric material having an index of refraction of greater than about 1.65.

45. The foil of claim 44, wherein the dielectric material is selected from the group consisting of zinc sulfide, zinc oxide, zirconium oxide, titanium dioxide, carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, neodymium oxide, praseodymium oxide, samarium oxide, antimony trioxide, silicon carbide, silicon nitride, silicon monoxide, selenium trioxide, tin oxide, tungsten trioxide, and combinations thereof.

46. The foil of claim 31, wherein the dielectric layer has an optical thickness in a range from about 2 QWOT at a design wavelength of about 400 nm to about 9 QWOT at a design wavelength of about 700 nm.

47. The foil of claim 31, wherein the dielectric layer is composed of a dielectric optical stack having a plurality of alternating layers of a high index material and a low index material.

48. The foil of claim 47, wherein the dielectric optical stack has a gradient index of refraction.

49. The foil of claim 31, wherein the absorber layer comprises a material selected from the group consisting of chromium, aluminum, nickel, palladium, platinum, titanium, vanadium, cobalt, iron, carbon, graphite, tin, tungsten, molybdenum, rhodium, niobium, and combinations or alloys thereof.

50. The foil of claim 31, wherein the absorber layer has a physical thickness of about 30 Å to about 500 Å.

51. A color shifting colorant composition, comprising:
   a pigment medium; and
   a plurality of color shifting pigment flakes dispersed in the pigment medium, each of the pigment flakes comprising:
      a first absorber layer;
      a first dielectric layer on the first absorber layer;
      a first selective absorbing layer on the first dielectric layer;
      a reflector layer on the first selective absorbing layer;
      a second selective absorbing layer on the reflector layer;
      a second dielectric layer on the second selective absorbing layer; and
      a second absorber layer on the second dielectric layer;
   wherein the pigment flakes exhibit a discrete color shift such that the pigment flakes have a first color at a first angle of incident light or viewing and a second color different from the first color at a second angle of incident light or viewing.

52. The colorant composition of claim 51, wherein the pigment medium comprises a material selected from the group consisting of acrylic melamine, urethanes, polyesters, vinyl resins, acrylates, methyl methacrylate, ABS resins, epoxies, styrenes, ink and paint formulations based on alkyd resins, and mixtures thereof.

53. The colorant composition of claim 51, wherein each of the pigment flakes has a dimension on any surface thereof ranging from about 2 microns to about 200 microns.

54. The colorant composition of claim 51, wherein the first and second absorber layers comprise a material selected from the group consisting of chromium, aluminum, nickel, palladium, platinum, titanium, vanadium, cobalt, iron, tin, tungsten, molybdenum, rhodium, niobium, and combinations or alloys thereof.

55. The colorant composition of claim 51, wherein the first and second dielectric layers are composed of one or more materials selected from the group consisting of low index dielectric materials, high index dielectric materials, and combinations thereof.

56. The colorant composition of claim 51, wherein the first and second selective absorbing layers comprise an inorganic material selected from the group consisting of silicon, silicon carbide, aluminum antimonide, aluminum arsenide, iron oxides, copper oxide, manganese oxide, cadmium sulfide, cadmium selenide, zinc selenide, $AgGaSe_2$, $Bi_{12}GeO_{20}$, titanium silicide, tantalum silicide, tungsten silicide, and combinations thereof.

57. The colorant composition of claim 51, wherein the first and second selective absorbing layers comprise an organic dye material.

58. The colorant composition of claim 57, wherein the organic dye material is selected from the group consisting of conjugated polymers, organic dyestuff molecules containing chromophores and auxochromes, basic or cationic dyes, acid and premetalized dyes, chrome and mordant dyes, direct and developed direct dyes, sulfur dyes, azoic dyes, vat dyes, disperse dyes, reactive dyes, and combinations thereof.

59. The colorant composition of claim 51, wherein the first and second selective absorbing layers each have a physical thickness of about 50 Å to about 2000 Å and are composed of the same material.

60. The colorant composition of claim 51, wherein the reflector layer comprises a reflective material selected from the group consisting of aluminum, silver, copper, gold, platinum, tin, titanium, palladium, nickel, cobalt, rhodium, niobium, chromium, and combinations or alloys thereof.

* * * * *